United States Patent
Fu

(10) Patent No.: US 8,243,427 B2
(45) Date of Patent: Aug. 14, 2012

(54) DISPLAY ASSEMBLY

(75) Inventor: Chien-Chun Fu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 472 days.

(21) Appl. No.: 12/497,750

(22) Filed: Jul. 6, 2009

(65) Prior Publication Data

US 2010/0290176 A1  Nov. 18, 2010

(30) Foreign Application Priority Data

May 15, 2009 (CN) .......................... 2009 1 0302364

(51) Int. Cl.
*H05K 5/00* (2006.01)
*H05K 7/00* (2006.01)

(52) U.S. Cl. ......... 361/679.21; 361/679.04; 361/679.05; 361/679.06; 361/679.07; 361/679.3; 361/679.55; 361/679.56; 361/679.59; 348/836; 348/838; 348/843; 248/917; 248/918; 248/919; 248/688

(58) Field of Classification Search ............. 361/679.04, 361/679.05, 679.06, 679.07, 679.21, 679.22, 361/679.26, 679.3, 679.55, 679.56, 679.59; 348/836, 838, 843; 248/688, 917, 918, 919
See application file for complete search history.

(56) References Cited

U.S. PATENT DOCUMENTS

| 7,054,148 B2 * | 5/2006 | Chen et al. ................. 361/679.4 |
| 2008/0136610 A1 * | 6/2008 | Limin et al. ................ 340/425.5 |
| 2010/0149438 A1 * | 6/2010 | Chen et al. .................... 348/836 |

* cited by examiner

*Primary Examiner* — Anthony Haughton
(74) *Attorney, Agent, or Firm* — Altis Law Group, Inc.

(57) ABSTRACT

A display assembly includes a flat panel display and a stand. The flat panel display includes a display screen and an angular adjusting mechanism. The angular adjusting mechanism includes a rotation motor and a transmission unit coupled to the rotation motor. The stand is pivotably attached to the flat panel display. The stand includes a gear rim. The gear rim is configured to mesh with the transmission unit. The rotation motor is capable of being controlled to actuate the transmission unit and the gear rim of the stand, thereby driving the stand to rotate relative to the flat panel display.

18 Claims, 14 Drawing Sheets

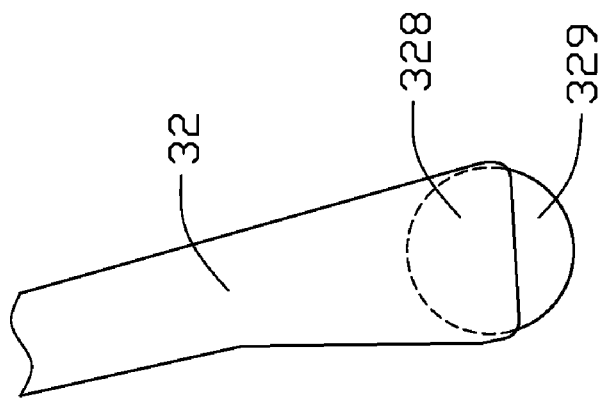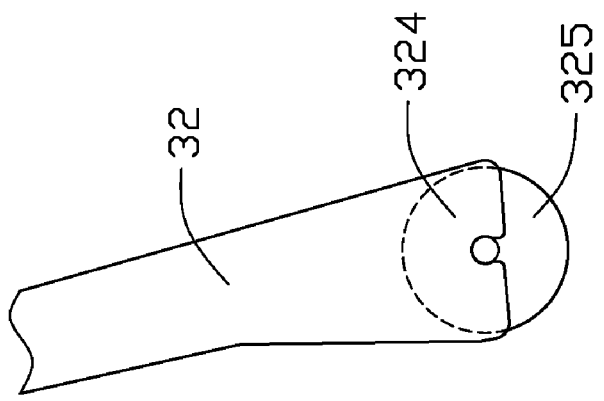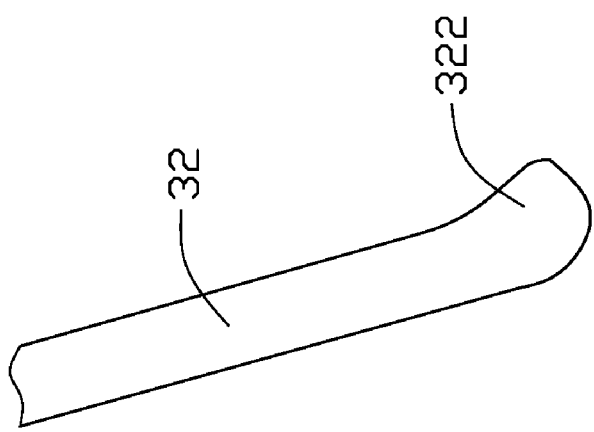
FIG. 10

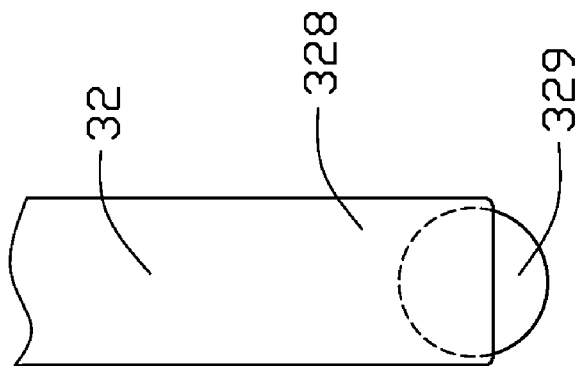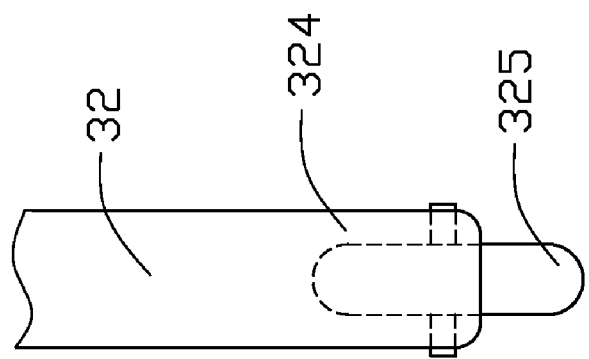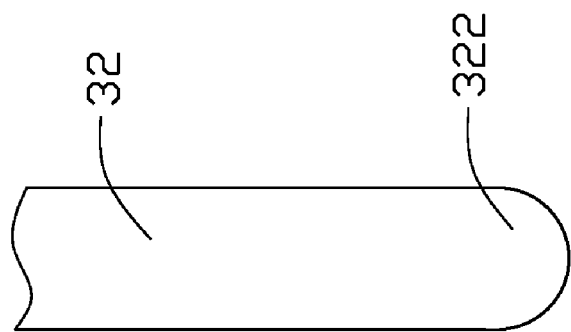
FIG. 11

DISPLAY ASSEMBLY

CROSS-REFERENCE TO RELATED APPLICATION

This application is related to co-pending U.S. patent application entitled "DISPLAY ASSEMBLY", application Ser. No. 12/497,756.

BACKGROUND

1. Technical Field

The disclosure generally relates to display assemblies, especially to a display assembly with an adjustable stand.

2. Description of Related Art

With increases in both the number of people using video display terminals and the amount of time that an individual user spends in front of the terminal, it has become evident that the occurrence of headaches, user fatigue, and eye, neck and back strain has increased. The ergonomics associated with video displays has become a major consideration in display design. A conventional flat display terminal can be manually adjusted through rotating a display screen relative to a stand. However, manual positioning the flat display terminal may require many adjustments, which is inconvenient.

BRIEF DESCRIPTION OF THE DRAWINGS

FIG. 10 is a side view of three selectable supporting portions of a stand.

FIG. 11 is a back view of the supporting potions of FIG. 10.

DETAILED DESCRIPTION

Figure 1:
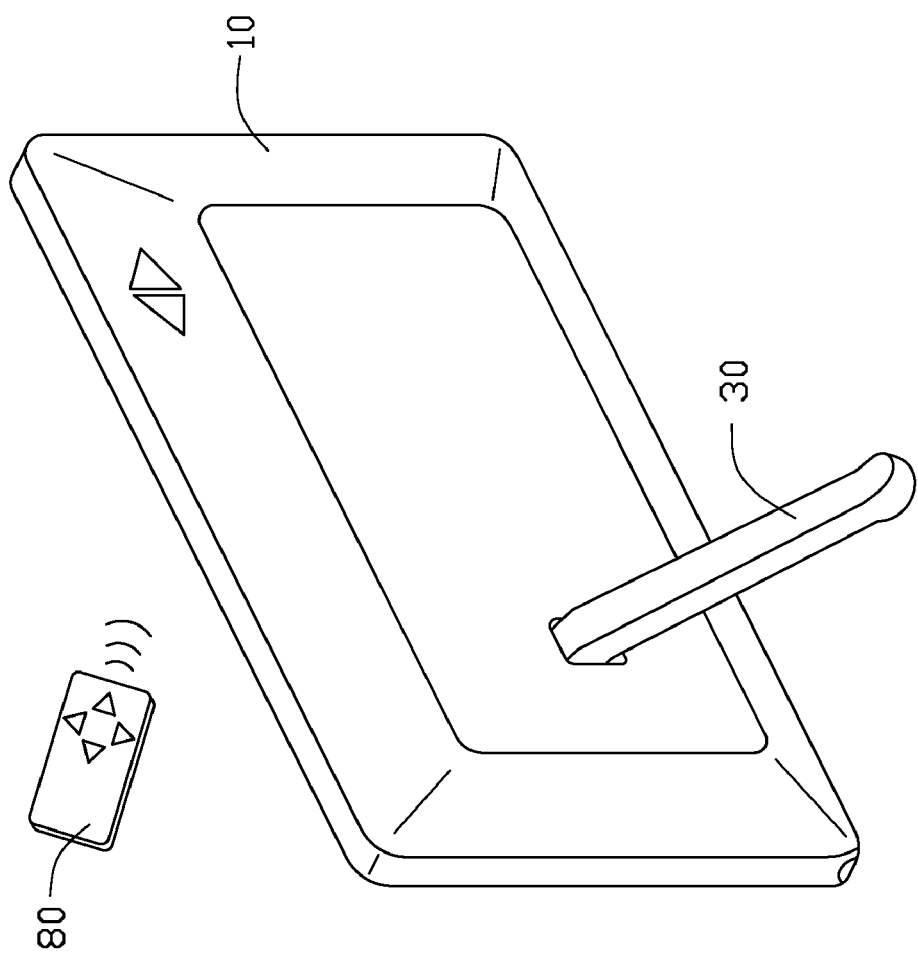
FIG. 1 and FIG. 2 are isometric views of a display assembly.
Figure 2:
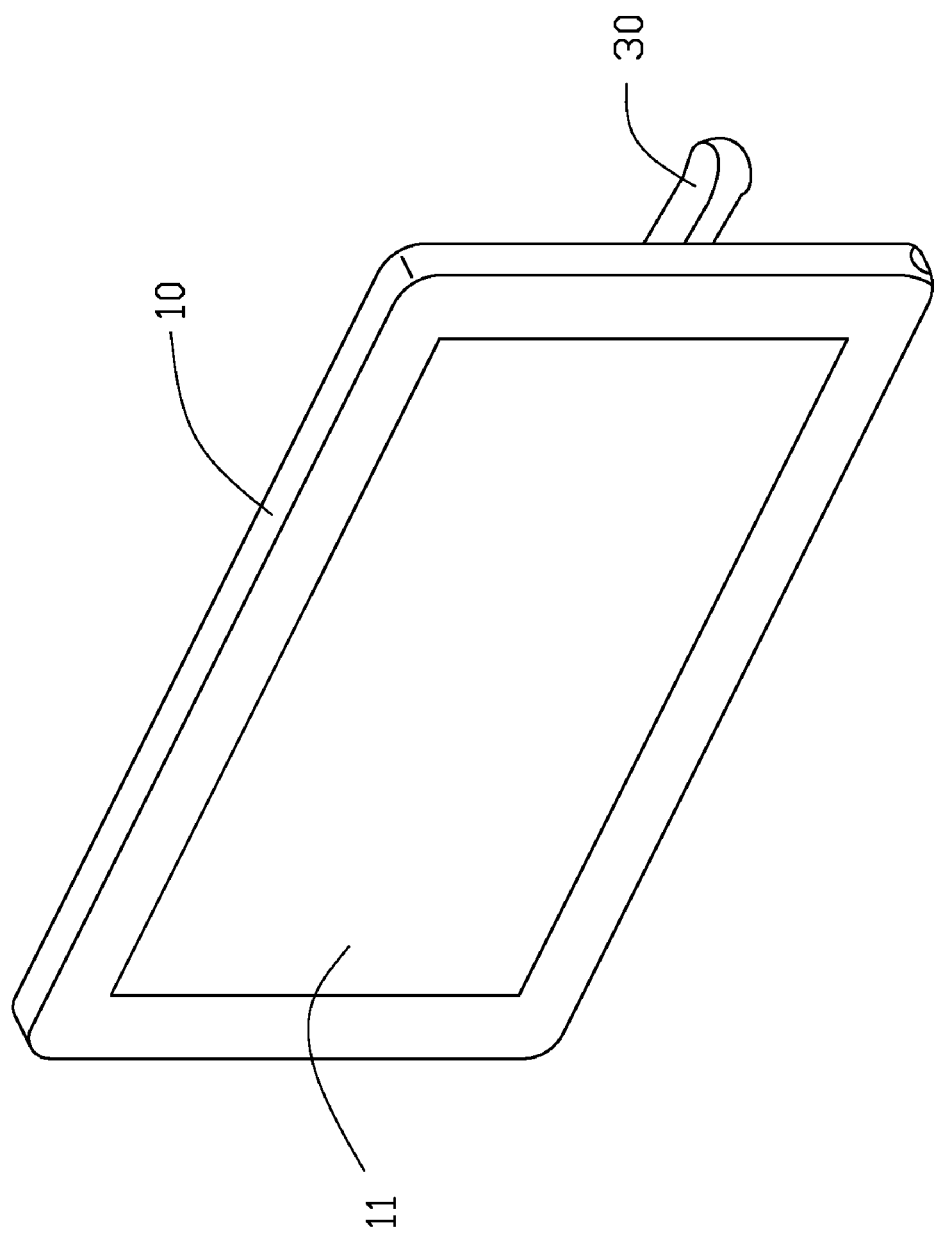
Figure 4:
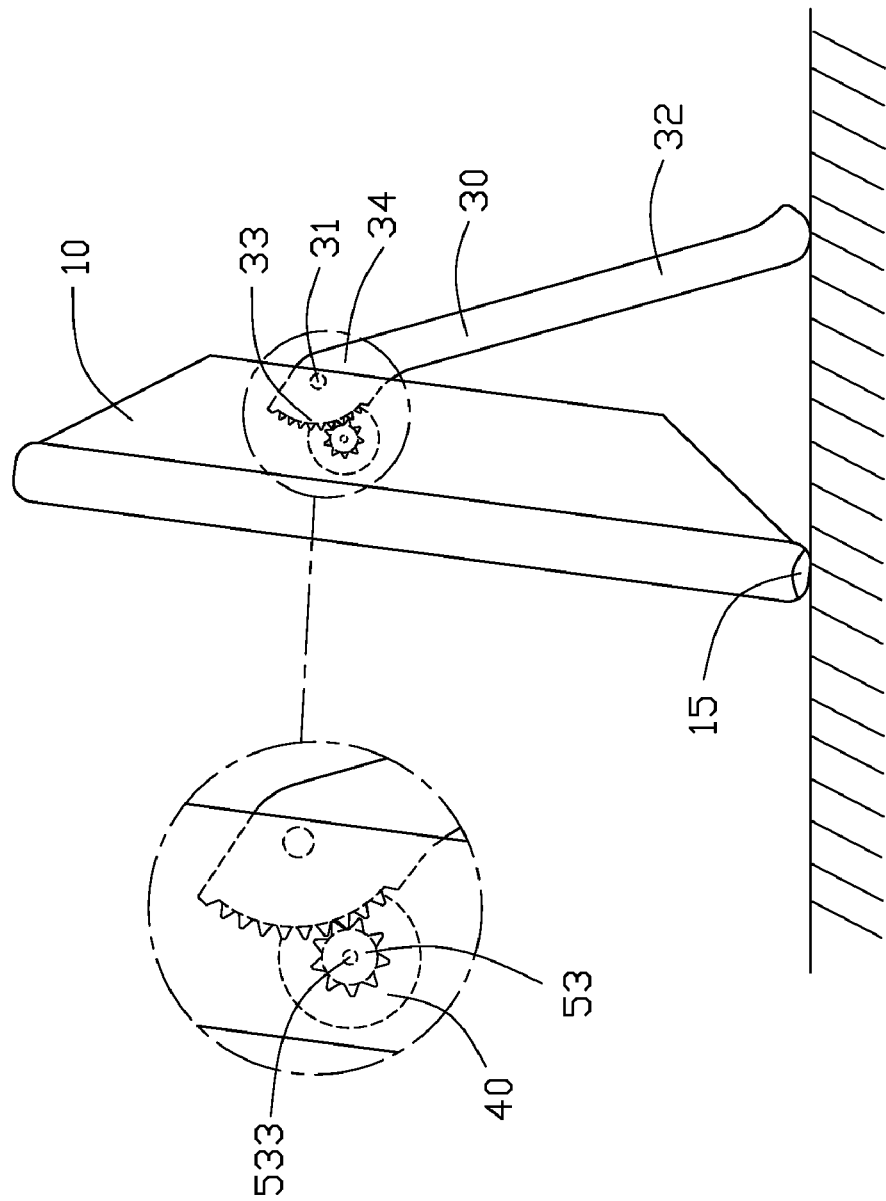
FIG. 4 is a side view of a display and a transmission unit of the display of a first embodiment, and an enlarged view of a cross-section portion of the display is shown.

Referring to FIG. 1 and FIG. 2, a display assembly includes a display 10 and a stand 30. The display 10 is a flat panel display 10. The display 10 includes a display screen 11, a housing and an angular adjusting mechanism (as shown in FIG. 4). A tilt angle of display 10 can be adjusted by an infra-red (IR) remote control 80.

Figure 3:
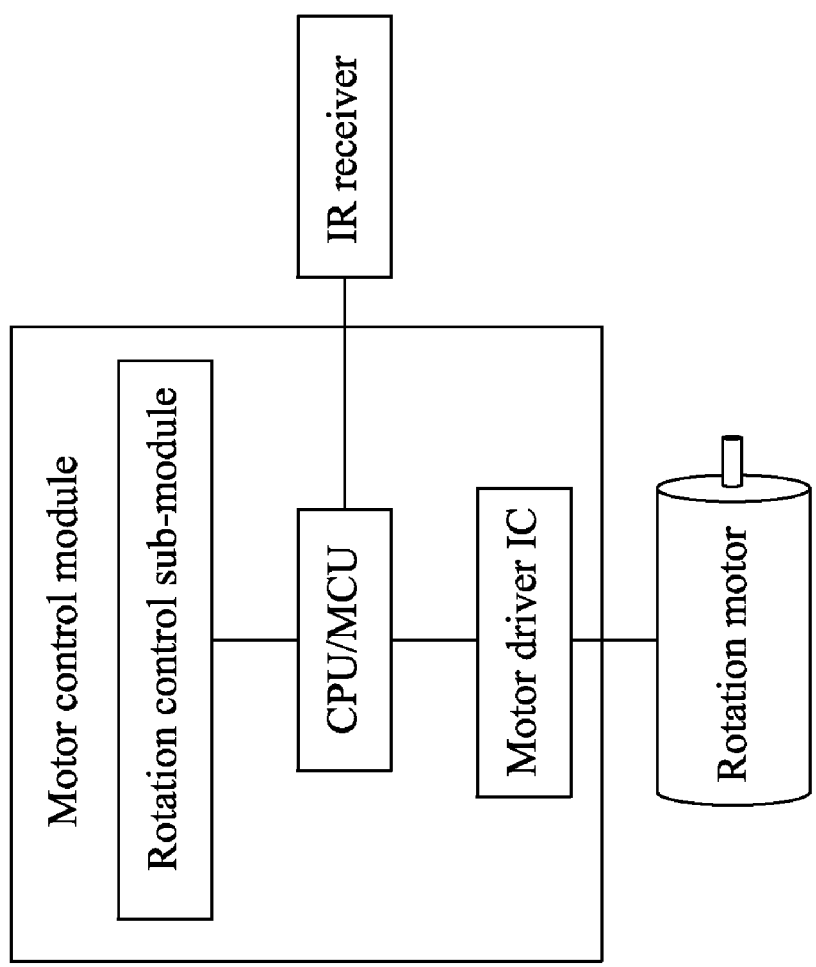
FIG. 3 is a block view of a display.

Referring to FIG. 3 and FIG. 4, the angular adjusting mechanism includes a rotation motor 40, a motor control module being operable for controlling the rotation motor 40, and a transmission unit coupled to the rotation motor 40. The motor control module includes a rotation control sub-module, a central processing unit (CPU) or a microcontroller (MCU), and a motor driver integrated circuit (IC). An IR receiver may be provided to couple to the IR remote control 80. The IR receiver is capable of receiving an adjusting control signal from the remote control 80 and outputting the adjusting control signal to the CPU/MCU. The CPU/MCU is capable of transforming the adjusting control signal into a control command and sending it to the motor driver IC. The rotation control sub-module is capable of acquiring a working state of the rotation motor 40 and sending it to CPU/MCU. The motor driver IC is capable of receiving a control command and controlling the rotation motor 40 to work. The rotation motor 40 can be a reverse rotation motor.

Figure 5:
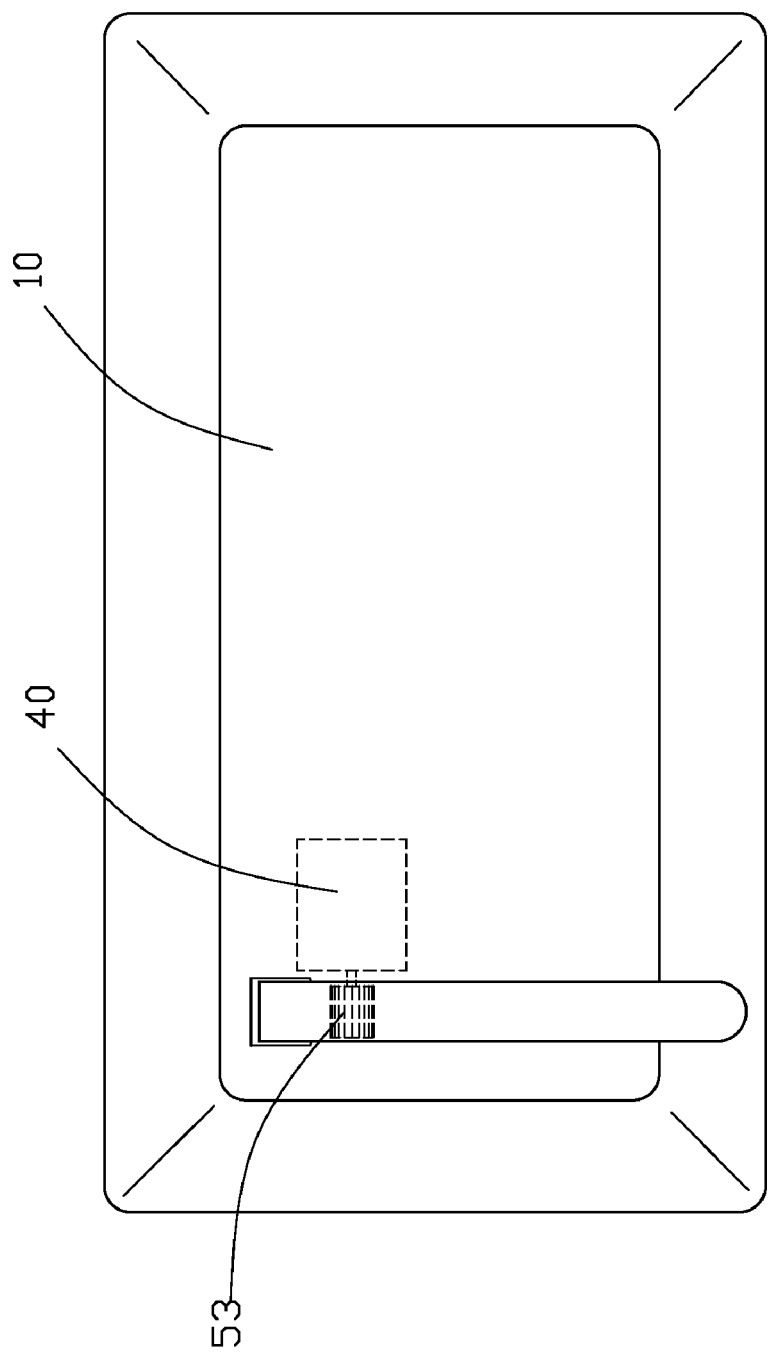
FIG. 5 is a back schematic view of the display of FIG. 4.

Referring to FIG. 4 and FIG. 5, the display 10, supported by the stand 30 in an upright position, is placed on a supporting surface. The stand 30 is also placed on the supporting surface. The stand 30 supports a backside of the display 10. A bottom portion of the display 10 has an anti-skid portion 15. The stand 30 includes a supporting portion 32 and an engaging portion 34 attached to the display 10. The engaging portion 34 is pivotable about a first pivot axis 31. The first pivot axis 31 is parallel to the display screen 11. The engaging portion 34 includes a gear rim 33. The gear rim 33 has a circular-arcuate configuration. The first pivot axis 31 extends through a central of the gear rim 33.

In a first embodiment, the transmission unit includes a first drive gear 53. The first drive gear 53 is directly actuated by the rotation motor 40 and meshes with the gear rim 33. When the rotation motor 40 receives the control command from the motor driver IC, the rotation motor 40 rotates with the first drive gear 53 and the gear rim 33, thereby the first drive gear 53 drives the stand 30 to rotate. The stand 30 is angled relative to the display 10. A viewing angle of the display screen 11 is adjusted.

Figure 6:
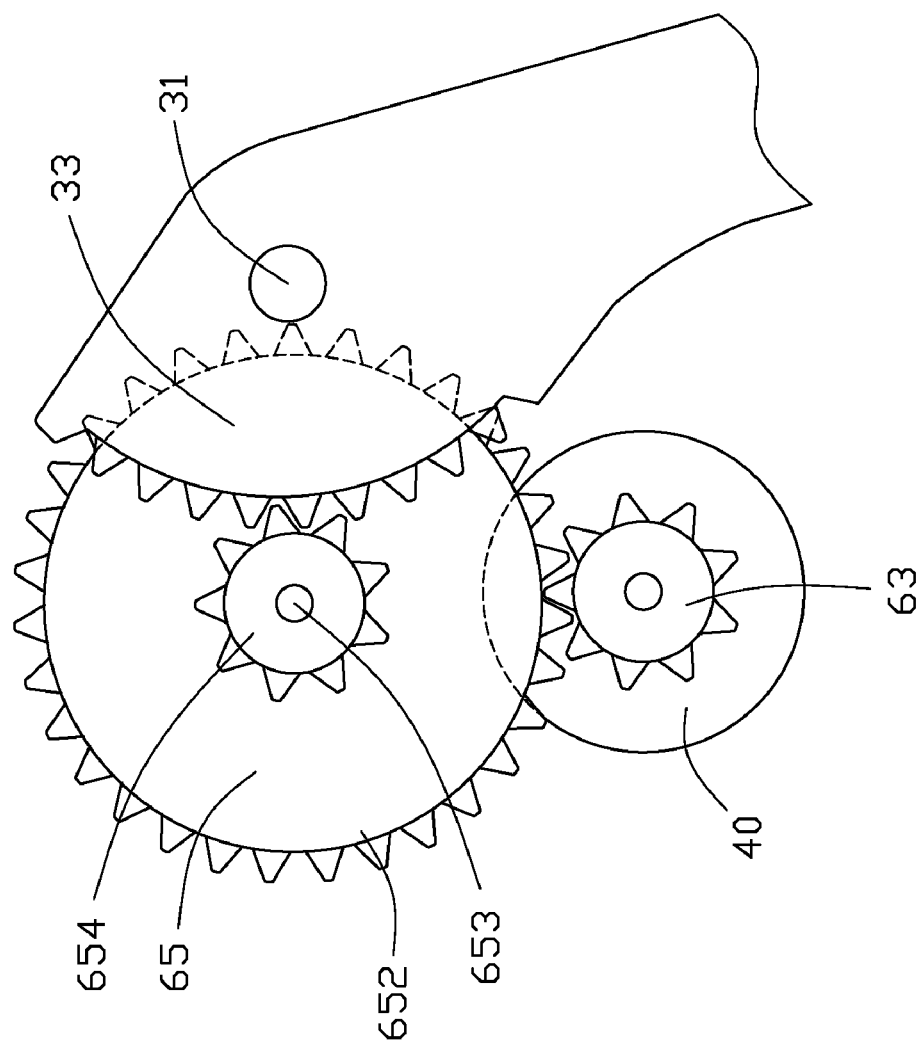
FIG. 6 is a partial schematic view of a transmission unit of a second embodiment.
Figure 7:
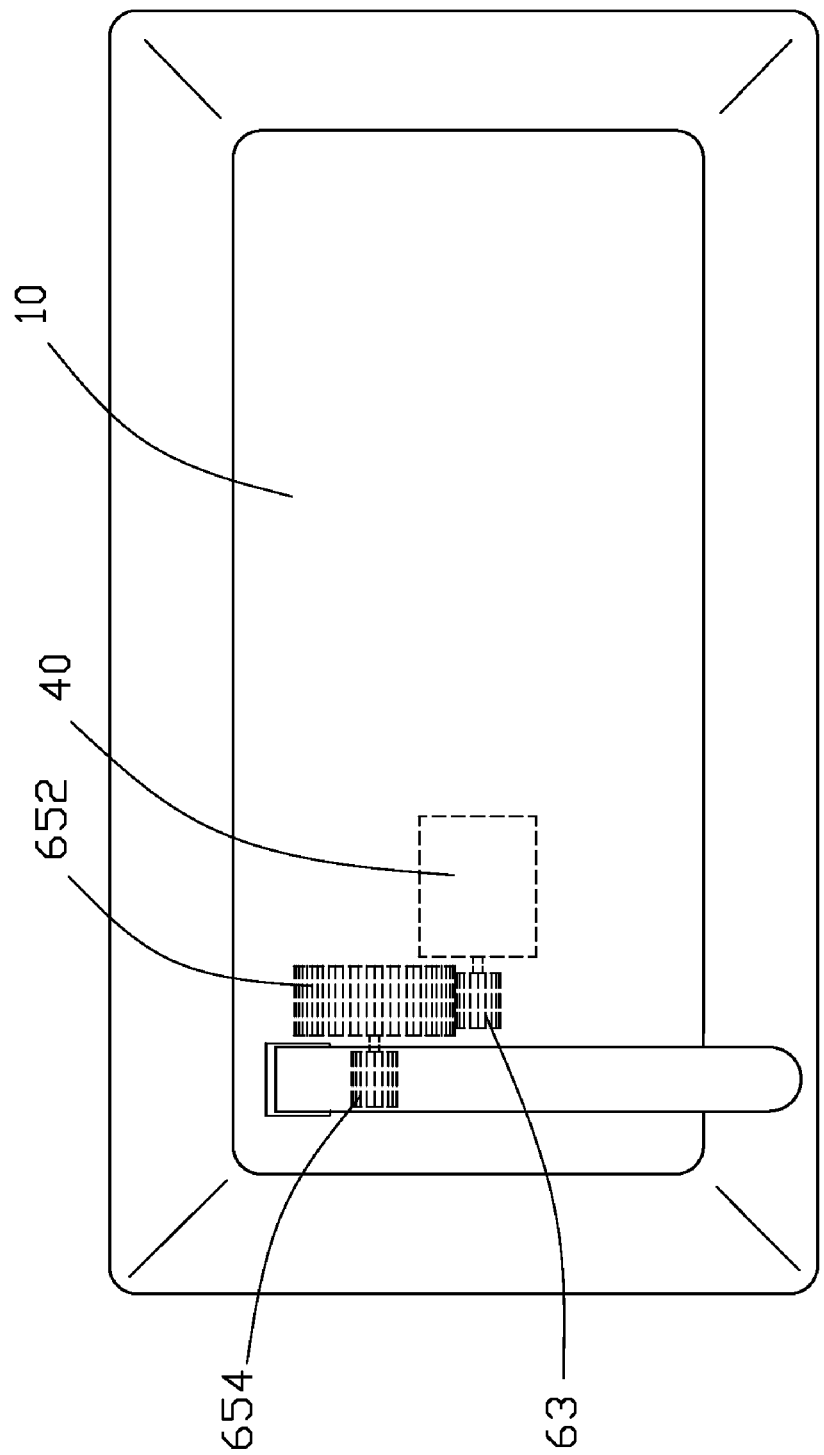
FIG. 7 is a back schematic view of the display of the second embodiment.

Referring to FIG. 6 and FIG. 7, in a second embodiment, the transmission unit includes a first drive gear 63 and a speed gear set 65. The first drive gear 63 is directly actuated by the rotation motor 40. The speed gear set 65 includes at least two speed gears. The speed gear set 65 includes a first speed gear 652 and a second speed gear 654 with smaller diameter relative to the first speed gear 652. The first speed gear 652 and the second speed gear 654 are pivotable about a second pivot axis 653. The second speed gear 654 meshes with the gear rim 33 of the stand 30. The first speed gear 652 meshes with the first drive gear 63. The speed gear set 65 may change a rotation speed transmitted from the first drive gear 63 to the gear rim 33, so that tilt angle of the stand 30 can be finely adjusted.

Figure 8:
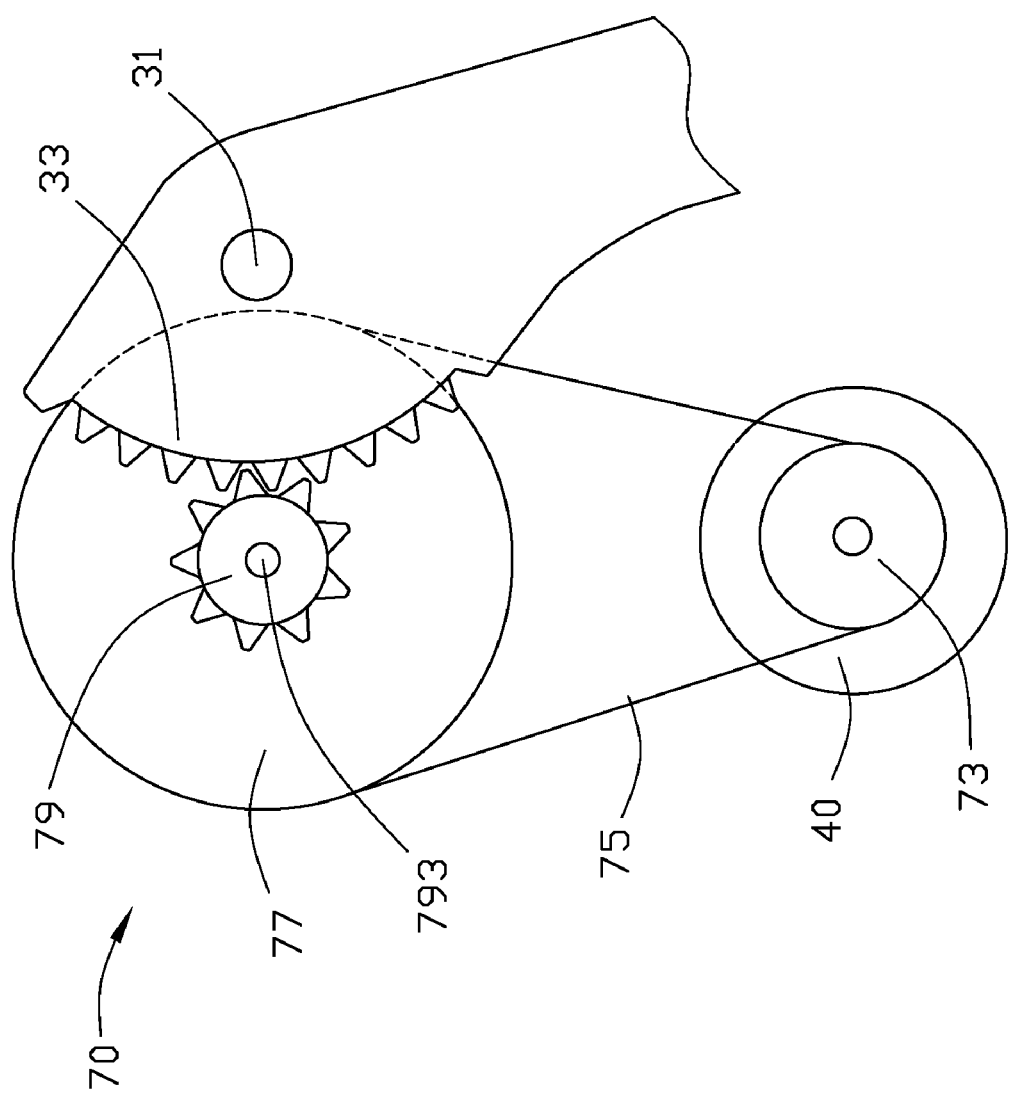
FIG. 8 is a partial schematic view of a transmission unit of a third embodiment.
Figure 9:
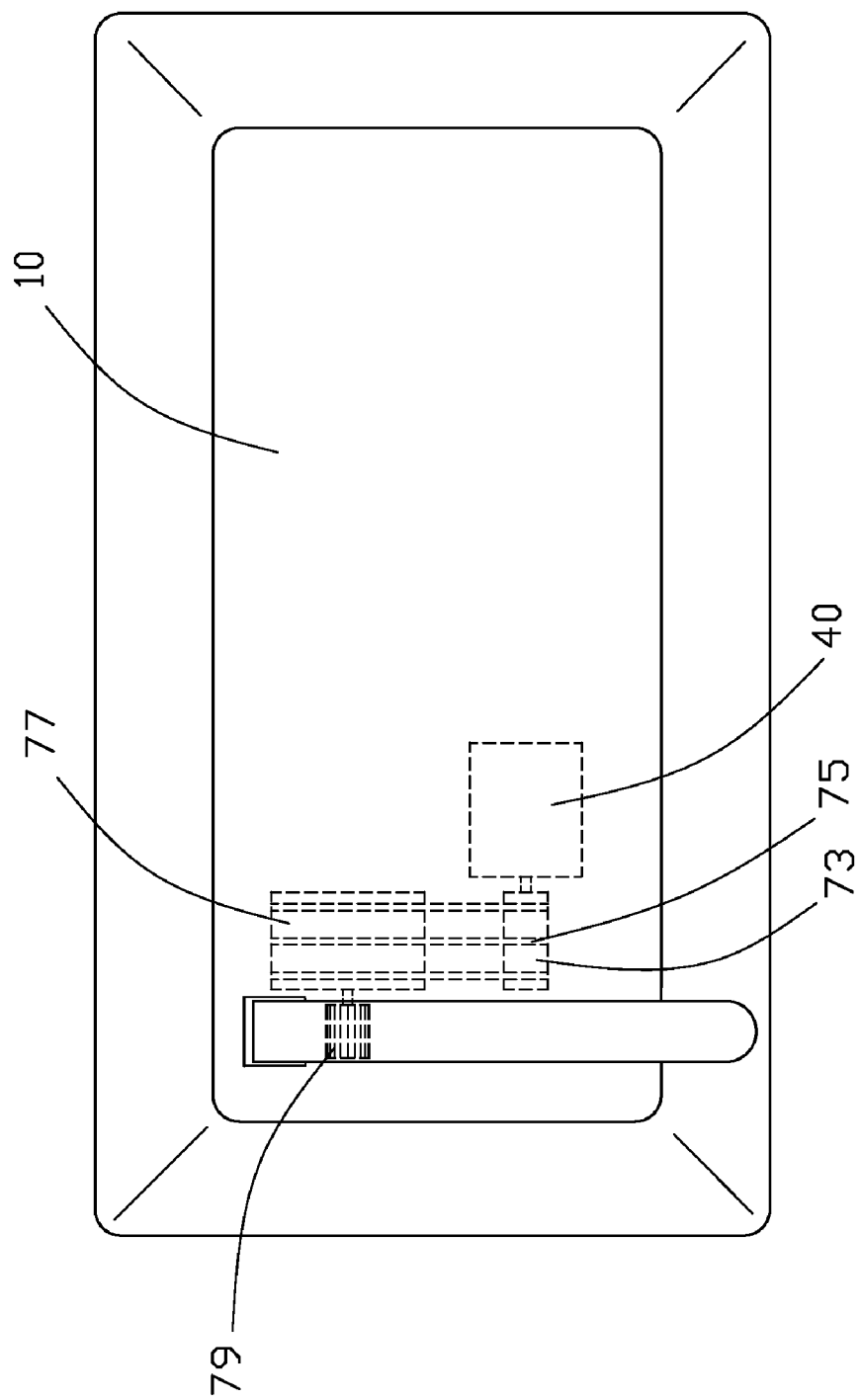
FIG. 9 is a back schematic view of the display of the third embodiment.

Referring to FIG. 8 and FIG. 9, in a third embodiment, the transmission unit includes a first drive wheel 40, a second drive wheel 77, and a second drive gear 79. The second drive wheel 77 has a larger diameter than the first drive wheel 73. The second drive gear 79 has a smaller diameter than the second drive wheel 77. The second drive wheel 77 is capable of being driven by the first drive wheel 73 by a transmission belt 75. The second drive wheel 77 and the second drive gear 79 can be rotated about a third pivot axis 793. The first drive wheel 73 is directly actuated by the rotation motor 40. The second drive gear 79 meshes with the gear rim 33 of the stand 30.

Figure 12:
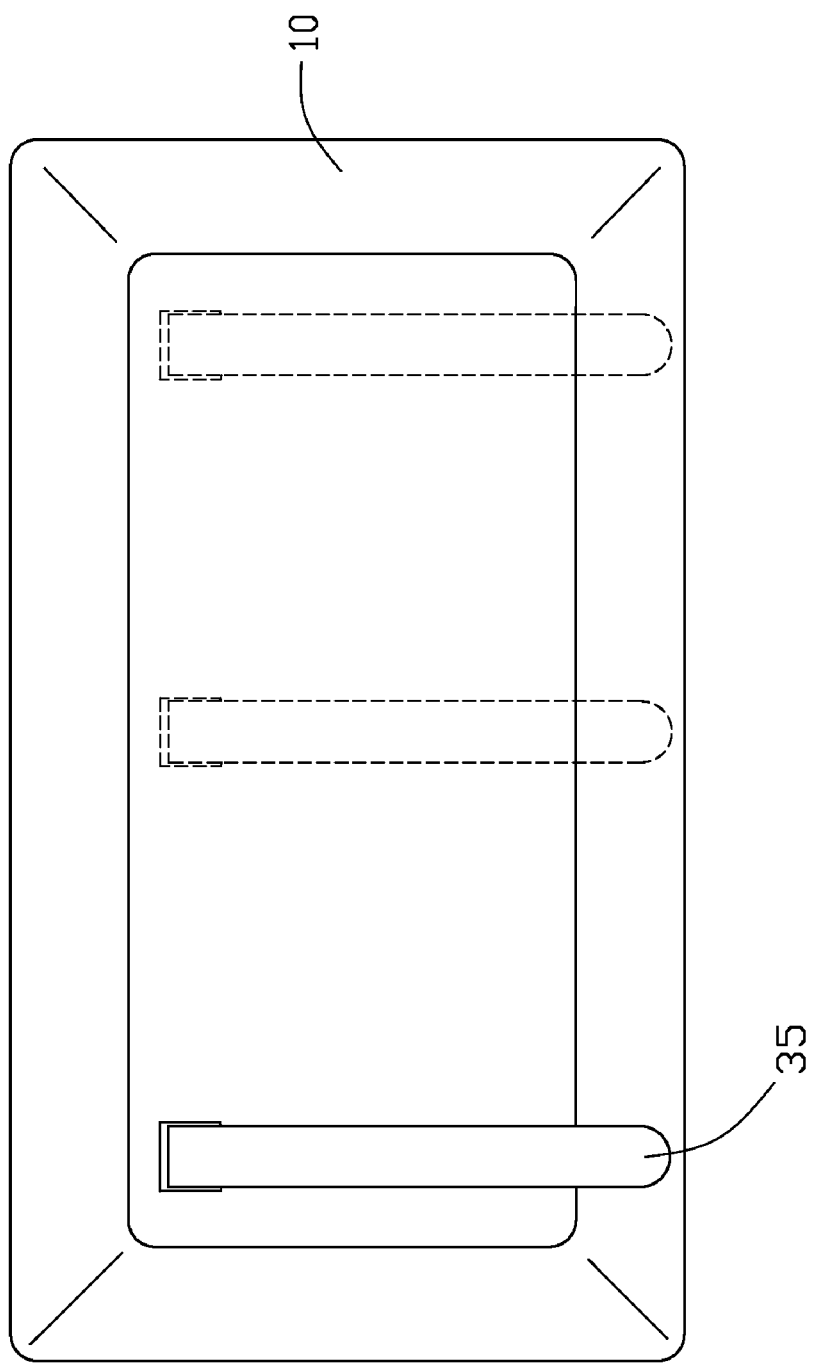
FIG. 12 is a back view of the display assembly.

Referring to FIG. 10 through FIG. 12, in above embodiments, the supporting portion 32 may have an arcuate distal end 322 to be supported by the supporting surface. Alternatively, the supporting portion 32 may have a sliding wheel 325 rotatably attached to a distal end 324 or have a ball 329 rotatably inserted into a distal end 328. The stand 30 may be assembled on a left side, a middle side or a right side of the display 10.

Figure 13:
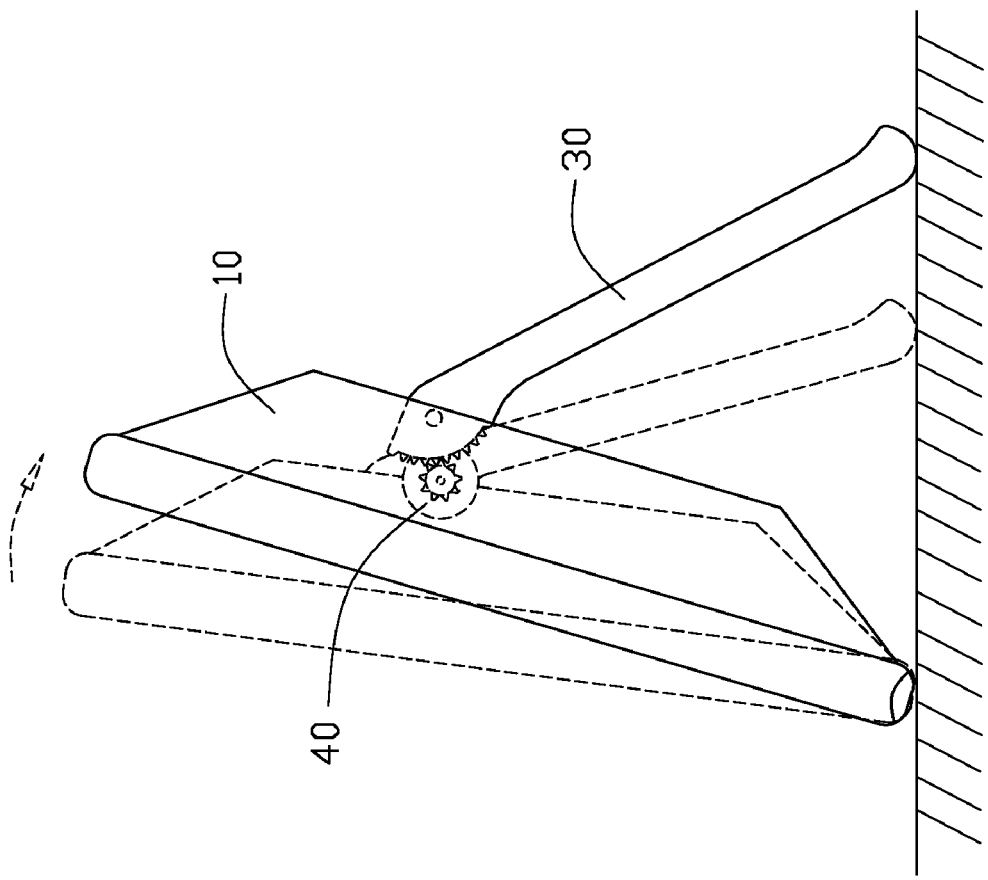
FIG. 13 and FIG. 14 are side views of the display assembly in different angular states.
Figure 14:
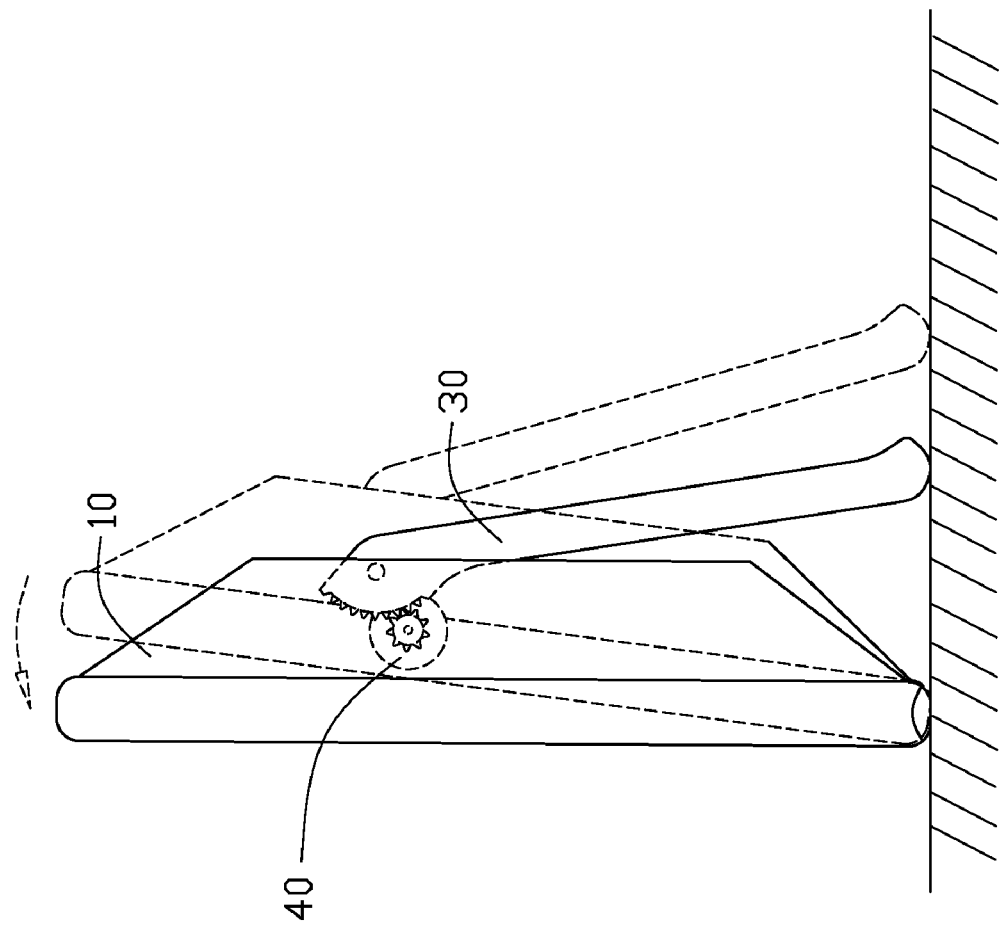

Referring to FIG. 13 and FIG. 14, when adjusting the display assembly, the stand 30 is rotated relative to the display 10 through the angular adjusting mechanism in above embodiments. The supporting portion 32 may move away relative to the display 10 or move towards the display 10, thereby adjusting a tilt angle of the display screen 11. Therefore, a viewer may adjust a viewing angle of the display along a vertical direction precisely and conveniently.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display assembly comprising:
a flat panel display comprising a display screen and an angular adjusting mechanism; the angular adjusting mechanism comprising a rotation motor and a transmission unit coupled to the rotation motor; and
a stand pivotably attached to the flat panel display; the stand being pivotable about a first pivot axis, and the stand comprising a gear rim; the gear rim configured to mesh with the transmission unit, wherein the rotation motor is capable of being controlled to actuate the transmission unit and the gear rim of the stand, thereby driving the stand to rotate relative to the flat panel display;
the angular adjusting mechanism further comprises: a motor control module being operable for controlling the rotation motor, the motor control module comprising a rotation control sub-module; a central process unit (CPU); and a motor driver integrated circuit;
the angular adjusting mechanism further comprises an infra-red (IR) receiver connected to the CPU, and the IR receiver is capable of receiving an adjustment control signal from a remote control.

2. The display assembly of the claim 1, wherein the gear rim has a circular-arcuate configuration, and the first pivot axis extends through a central of the gear rim.

3. The display assembly of the claim 1, wherein the transmission unit comprising a first drive gear, and the first drive gear is directly actuated by the rotation motor and meshes with the gear rim.

4. The display assembly of the claim 1, wherein the transmission unit comprises a first drive gear and a speed gear set, the first drive gear is directly actuated by the rotation motor, the speed gear set comprises a first speed gear and a second speed gear with smaller diameter relative to the first speed gear, the second speed gear meshes with the gear rim, and first speed gear meshes with the first drive gear.

5. The display assembly of the claim 1, wherein the transmission unit comprises a first drive wheel, a second drive wheel and a second drive gear, the second drive wheel has larger diameter than the first drive wheel, the second drive wheel is capable of being driven by the first drive wheel by a transmission belt, the second drive wheel and the second drive gear are rotated about a same axis, the first drive wheel is directly actuated by the rotation motor, and the second drive gear meshes with the gear rim of the stand.

6. The display assembly of the claim 1, wherein the rotation motor is a reverse rotation motor.

7. The display assembly of the claim 1, wherein the stand has a sliding wheel at a distal end thereof 8. The display assembly of the claim 1, wherein the first pivot axis parallel to the display screen.

9. A display assembly comprising:
a flat panel display comprising a display screen and an angular adjusting mechanism; the angular adjusting mechanism comprising a rotation motor and a transmission unit coupled to the rotation motor; and
a stand pivotably attached to the flat panel display, the stand being pivotable about a first pivot axis; the stand comprising an engaging portion, the engaging portion being configured to couple to the transmission unit; the first pivot axis parallel to the display screen, and the rotation motor is capable of being controlled to actuate the transmission unit and the engaging portion of the stand, thereby driving the stand to rotate relative to the flat panel display;
wherein the transmission unit comprises a first drive wheel, a second drive wheel and a second drive gear, the second drive wheel has larger diameter than the first drive wheel, the second drive wheel is capable of being driven by the first drive wheel by a transmission belt, the second drive wheel is rotated with the second drive gear about a same axis, the first drive wheel is directly actuated by the rotation motor, and the second drive gear meshes with the engaging portion of the stand.

10. The display assembly of the claim 9, wherein the angular adjusting mechanism further comprises: a motor control module being operable for controlling the rotation motor, the motor control module comprising a rotation control sub-module; a central process unit (CPU); and a motor driver integrated circuit.

11. The display assembly of the claim 10, wherein angular adjusting mechanism further comprises an infra-red (IR) receiver connected to the CPU, and the IR receiver is capable of receiving an adjusting control single from a remote control.

12. The display assembly of the claim 9, wherein the engaging portion comprises an arcuate gear rim.

13. The display assembly of the claim 9, wherein the transmission unit comprising a first drive gear, and the first drive gear is directly actuated by the motor and meshes with the engaging portion.

14. The display assembly of the claim 9, wherein the transmission unit comprises a first drive gear and a speed gear set, the first drive gear is directly actuated by the rotation motor, the speed gear set comprises a first speed gear and a second speed gear with smaller diameter relative to the first speed gear, the second speed gear meshes with the engaging portion, and first speed gear meshes with the first drive gear.

15. The display assembly of the claim 9, wherein the rotation is a reverse rotation motor.

16. The display assembly of the claim 9, wherein the stand has a sliding wheel at a distal end thereof.

17. A display assembly comprising:
a flat panel display comprising a display screen and an angular adjusting mechanism; the angular adjusting mechanism comprising a rotation motor and a transmission unit coupled to the rotation motor; and
a stand pivotably attached to the flat panel display; the stand being pivotable about a first pivot axis, and the stand comprising a gear rim; the gear rim configured to mesh with the transmission unit, wherein the rotation motor is capable of being controlled to actuate the transmission unit and the gear rim of the stand, thereby driving the stand to rotate relative to the flat panel display; and
the stand has a sliding wheel at a distal end thereof wherein the transmission unit comprises a first drive wheel, a second drive wheel and a second drive gear, the second drive wheel has larger diameter than the first drive wheel, the second drive wheel is capable of being driven by the first drive wheel by a transmission belt, the second drive wheel and the second drive gear are rotated about a same axis, the first drive wheel is directly actuated by the rotation motor, and the second drive gear meshes with the gear rim of the stand.

18. The display assembly of the claim 17, wherein a rotating axis of the sliding wheel is parallel to the first pivot axis.

* * * * *